US008353034B2

(12) United States Patent
Ji et al.

(10) Patent No.: US 8,353,034 B2
(45) Date of Patent: Jan. 8, 2013

(54) SYSTEM AND METHOD TO LOCATE A PREFIX HIJACKER WITHIN A ONE-HOP NEIGHBORHOOD

(75) Inventors: Lusheng Ji, Randolph, NJ (US); Dan Pei, Jersey City, NJ (US); Tongqing Qiu, Atlanta, GA (US); Jia Wang, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1019 days.

(21) Appl. No.: 12/277,782

(22) Filed: Nov. 25, 2008

(65) Prior Publication Data

US 2010/0132037 A1   May 27, 2010

(51) Int. Cl.
*G06F 17/30* (2006.01)
(52) U.S. Cl. .......................................... 726/22; 713/152
(58) Field of Classification Search .................... 726/22, 726/13, 23, 24, 25; 709/224, 223, 225, 226
See application file for complete search history.

(56) References Cited

U.S. PATENT DOCUMENTS

| | | | |
|---|---|---|---|
| 7,624,447 B1* | 11/2009 | Horowitz et al. ............... 726/23 |
| 7,712,134 B1* | 5/2010 | Nucci et al. ..................... 726/23 |
| 7,823,202 B1* | 10/2010 | Nucci et al. ..................... 726/22 |
| 7,930,424 B1* | 4/2011 | Nucci et al. ................... 709/238 |
| 8,141,156 B1* | 3/2012 | Mao et al. ........................ 726/23 |
| 2001/0005883 A1* | 6/2001 | Wray et al. ..................... 713/151 |
| 2004/0054925 A1* | 3/2004 | Etheridge et al. ............. 713/201 |
| 2004/0187023 A1* | 9/2004 | Alagna et al. ................. 713/200 |
| 2006/0287607 A1* | 12/2006 | Sackellares et al. .......... 600/544 |
| 2007/0237080 A1* | 10/2007 | Savagaonkar ................. 370/235 |
| 2009/0044276 A1* | 2/2009 | Abdel-Aziz et al. ............ 726/24 |
| 2009/0198832 A1* | 8/2009 | Shah et al. ..................... 709/239 |

OTHER PUBLICATIONS

Zheng et al, A light weight distributed scheme for detecting IP prefix hijacks in real-time, Aug. 2007, ACM, p. 277-288.*

\* cited by examiner

*Primary Examiner* — Eleni Shiferaw
*Assistant Examiner* — Abu Sholeman
(74) *Attorney, Agent, or Firm* — Hoffmann & Baron, LLP (57) ABSTRACT

Method, system and computer-readable medium to locate a prefix hijacker of a destination prefix within a one-hop neighborhood on a network. The method includes generating one-hop neighborhoods from autonomous system (AS)-level paths of plural monitors to a destination prefix. The method also includes determining a suspect set of AS identifiers resulting from a union of the one-hop neighborhoods. The method further includes calculating a count and a distance associated with each AS identifier of the suspect set. The count indicates how often the AS identifier appeared in the one-hop neighborhoods. The distance indicates a total distance from the AS identifier to AS identifiers associated with the plural monitors. Yet further, the method includes generating a one-hop suspect set of AS identifiers from the suspect set that have highest counts and highest distances.

24 Claims, 5 Drawing Sheets

AS Paths Before Destination Prefix Hijacking

Monitor #4: AS Path = [4, 1257, 850, 635, 134]
Monitor #6: AS Path = [6, 1258, 51, 67, 134]

FIG. 4A

AS Paths After Destination Prefix Hijacking

Monitor #4: AS Path = [4, 1257, 93, 134]
Monitor #6: AS Path = [6, 1258, 93, 134]

SYSTEM AND METHOD TO LOCATE A PREFIX HIJACKER WITHIN A ONE-HOP NEIGHBORHOOD

TECHNICAL FIELD

The present application relates generally to network security threats. More specifically, the present application is directed to a system, method and computer storage medium to locate a hijacker of a destination prefix (e.g., prefix hijacker) within a one-hop neighborhood on a network, such as the Internet.

BACKGROUND

Prefix hijacking refers to a misconfigured or a malicious border gateway protocol (BGP) router that originates or announces a route to an Internet Protocol (IP) destination prefix (e.g., a destination prefix) that it does not own. This is becoming an increasingly serious Internet security thereat.

On a network, such as the Internet, IP packets are routed based on destination IP addresses. Routing tables of BGP routers are also organized based on the destination IP addresses. For scalability, plural destination IP addresses may be represented collectively by an IP destination prefix and routes stored in the BGP routers' routing tables are indexed based on the IP destination prefix. The IP destination prefix indicates an address portion common to the plural destination IP addresses (e.g., destination prefix) and a number of bits associated with the destination prefix. For example, a destination prefix of 168.205.122/24 indicates that a first 24 bits are common to destination IP addresses represented by the destination prefix (e.g., 10101000 11001101 01111010 in binary or 168.205.122 in hexadecimal). The example destination prefix may represent destination IP addresses from 168.205.122.0 to 168.205.122.255.

On the Internet, one or more subnet networks that are under control of an independently administered domain constitute an autonomous system (AS), which is identified via a unique numerical ID (e.g., AS ID) assigned to it by its regional Internet registry. The AS includes one or more BGP routers to facilitate inter-domain routing, e.g., routing of IP traffic through neighboring autonomous systems (ASes). The AS ID is associated with one or more IP destination prefixes that the AS owns.

The Internet includes tens of thousands of ASes. ASes establish neighboring relationships, employing BGP routers to maintain and exchange inter-domain routing information (or routing announcements). BGP operates based on the assumption that there is implicit trust among the ASes. As a result, inter-domain routing between ASes is incapable of preventing a BGP router of a malicious AS (e.g., prefix hijacker) from announcing a route to a destination prefix using a fabricated AS path (e.g., false announcement). Such a false announcement may cascade quickly to a large number of BGP routers across multiple ASes and pollute their associated routing tables.

Based on the false announcements, entries in the routing tables may be updated by the BGP routers for the destination prefix because the BGP router's malicious AS appears to be a very attractive next hop for forwarding traffic towards that destination prefix, resulting in hijacking of the destination prefix. Thus, IP traffic from certain parts of the Internet destined to the destination prefix may be affected. For example, the malicious AS may drop all IP traffic addressed to the destination prefix to effectively cause a denial of service attack against the destination prefix. The malicious AS may also redirect IP traffic to an alternate destination prefix that may operate as a phishing attack. Other types of attacks are also possible by hijacking the destination prefix. As a result, one or more networks of a domain identified by the hijacked destination prefix may experience performance degradation, service outage, and/or a serious security breach.

Destination prefix monitors (e.g., prefix hijack monitors) may be disposed at certain ASes on the Internet to determine and report AS-level paths of IP traffic from the ASes at which the prefix hijack monitors are disposed to the destination prefix across the Internet using a traceroute program. It would be desirable to locate a prefix hijacker of a destination prefix within a one-hop neighborhood using the reported AS-level paths.

SUMMARY

In accordance with a particular embodiment, a method for locating a prefix hijacker within a one-hop neighborhood over a network is disclosed. The method includes generating one-hop neighborhoods from autonomous system (AS)-level paths of plural monitors to a destination prefix. The method also includes determining a suspect set of AS identifiers resulting from a union of the one-hop neighborhoods. The method further includes calculating a count and a distance associated with each AS identifier of the suspect set. The count indicates how often the AS identifier appeared in the one-hop neighborhoods. The distance indicates a total distance from the AS identifier to AS identifiers associated with the plural monitors. Yet further, the method includes generating a one-hop suspect set of AS identifiers from the suspect set that have highest counts and highest distances.

In accordance with another embodiment, a prefix hijacker location system is disclosed. The prefix hijacker location system includes a neighborhood generation module, a suspect set generation module, and a one-hop suspect set generation module. The neighborhood generation module is configured to generate one-hop neighborhoods from autonomous system (AS)-level paths of plural monitors to a destination prefix. The suspect set generation module is configured to determine a suspect set of AS identifiers resulting from a union of the one-hop neighborhoods. The suspect set generation module is further configured to calculate a count and a distance associated with each AS identifier of the suspect set. The count indicates how often the AS identifier appeared in the one-hop neighborhoods. The distance indicates a total distance from the AS identifier to AS identifiers associated with the plural monitors. The one-hop suspect set generation module is configured to generate a one-hop suspect set of AS identifiers from the suspect set that have highest counts and highest distances.

In accordance with another embodiment, a computer-readable storage medium is disclosed. The medium includes operational instructions that, when executed by a processor, cause the processor to computer-readable storage medium comprising operational instructions that, when executed by a processor, cause the processor to generate one-hop neighborhoods from autonomous system (AS)-level paths of plural monitors to a destination prefix. The medium also includes operational instructions that, when executed by a processor, cause the processor to determine a suspect set of AS identifiers resulting from a union of the one-hop neighborhoods. The medium further includes operational instructions that, when executed by a processor, cause the processor to calculate a count and a distance associated with each AS identifier of the suspect set. The count indicates how often the AS identifier appeared in the one-hop neighborhoods. The distance indicates a total distance from the AS identifier to AS identifiers associated with the plural monitors. Yet further, the medium includes operational instructions that, when executed by a processor, cause the processor to generate a one-hop suspect set of AS identifiers from the suspect set that have highest counts and highest distances.

BRIEF DESCRIPTION OF THE DRAWINGS

Some embodiments are illustrated by way of example and not limitation in the figures of the accompanying drawings in which:

FIG. 1 is a block diagram of an example distribution topology configured to distribute IP traffic to a destination autonomous system (AS) over a transmission network before hijacking of a destination prefix of the destination AS;

FIG. 3 is a block diagram of an example distribution topology configured to distribute IP traffic to a destination autonomous system (AS) over a transmission network after hijacking of a destination prefix of the destination AS;

DETAILED DESCRIPTION

System, method and computer-readable storage medium to locate a prefix hijacker of a destination prefix within a one-hop neighborhood are disclosed. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
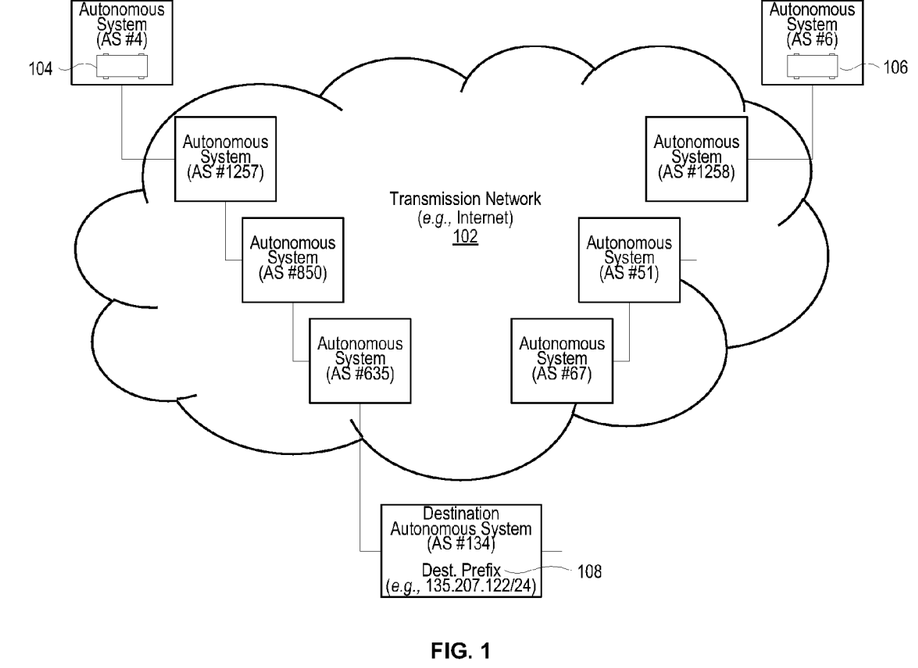

FIG. 1 is a block diagram of an example distribution topology 100 configured to distribute IP traffic to a destination AS #134 over a transmission network 102 before hijacking of a destination prefix 108 of the destination AS #134. The transmission network 102 may be the Internet. While the example distribution topology 100 illustrates nine ASes #4, #6, #51, #67, #134, #635, #850, #1257 and #1258, for brevity, clarity and to aid understating, it is understood that the distribution topology 100 may include substantially more ASes that may be disposed in substantially different relationships than shown in the distribution topology 100 of FIG. 1.

As will be described below in relation to FIG. 2, each of the illustrated ASes #4, #6, #51, #67, #134, #635, #850, #1257 and #1258 includes at least one border gateway protocol (BGP) router. The BGP router of each of the ASes is configured to communicate with BGP routers of its neighboring ASes to transmit IP traffic. For example, in the distribution topology 100 of FIG. 1, a BGP router of AS #1257 is configured to communicate with BGP routers of neighboring ASes #4, #850. The BGP router of each of the ASes includes a routing table that maintains for a certain destination prefix, such as destination prefix 108 of the destination AS #134, a next hop AS in a route from that AS to the destination prefix and an AS-level path from that AS to the destination prefix (e.g., destination prefix 135.207.122/24).

In the illustrated distribution topology 100 of FIG. 1, a prefix hijack monitor 104 is disposed at AS #4 and a prefix hijack monitor 106 is disposed at AS #6. While two prefix hijack monitors 104, 106 are shown for illustration purposes, it is understood that a substantially larger number of prefix hijack monitors may be disposed in the transmission network 102. The prefix hijack monitors 104, 106 are configured to monitor the destination prefix (e.g., destination prefix 135.207.122/24), determining and reporting AS-level paths from the ASes at which the prefix hijack monitors 104, 106 are disposed (e.g., ASes #4, #6, respectively) to the destination prefix (e.g., destination prefix 135.207.122/24) across the transmission network 102. The prefix hijack monitors 104, 106 may execute a traceroute program to determine the AS-level paths from the ASes at which the prefix hijack monitors 104, 106 are disposed to the destination prefix across the transmission network 102.

Figure 4A:
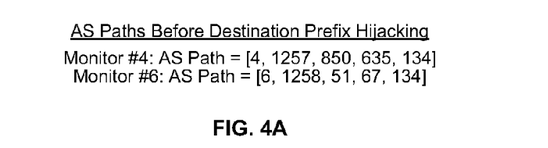
FIG. 4A illustrates example AS-level paths generated and reported by plural prefix hijack monitors before hijacking of a destination prefix of a destination autonomous system (AS)

The example distribution topology 100 of FIG. 1 is illustrated before a prefix hijacker hijacks the destination prefix 108 of the destination AS #134. The AS-level paths generated and reported by the prefix hijack monitors 104, 106 before hijacking of the destination prefix 108 of the destination AS #134 are illustrated in FIG. 4A. The AS-level path from the prefix hijack monitor 104 disposed at AS #4 is [4, 1257, 850, 635, 134] and the AS-level path from the prefix hijack monitor 106 disposed at AS #6 is [6, 1258, 51, 67, 134].

Figure 2:
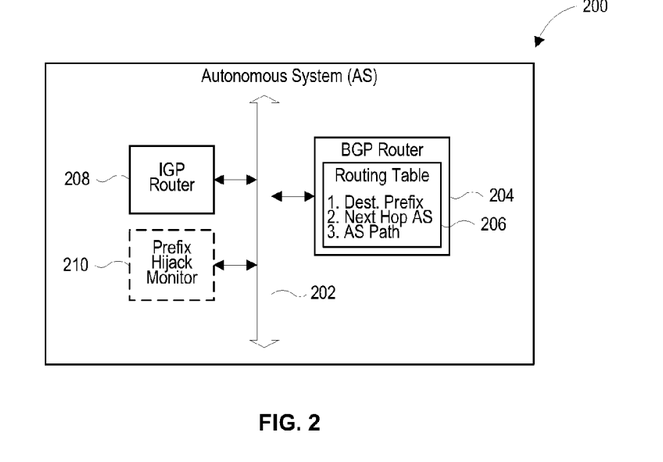
FIG. 2 is an example autonomous system (AS)

FIG. 2 is an example autonomous system (AS) 200 in accordance with FIG. 1. AS 200 includes at least one intra-domain network 202 that interconnects at least one BGP router 204, at least one interior gateway protocol (IGP) router 208 and optionally a prefix hijack monitor 210. The at least one BGP router is configured to maintain and exchange inter-domain routing information with BGP routers of the neighboring ASes to facilitate routing of IP traffic to and from the neighboring ASes, as illustrated in FIG. 1, for example. The BGP router 204 includes a routing table 204 that maintains: (1) a destination prefix; (2) a next hop AS; and (3) an AS-level path.

As an example, AS 200 may be AS #4 of FIG. 1. In this example, the destination prefix of the routing table 204 is the destination prefix 108 (e.g., 135.207.27/24) of destination AS #134. The next hop AS associated with the destination prefix 108 is AS #1257, and the AS-level path from the AS #4 to the destination prefix is [#4, #1257, #850, #635, #134]. As another example, AS 200 may be AS #6 of FIG. 1. In this example, the destination prefix of the routing table 204 is destination prefix 108 (e.g., 135.207.27/24) of destination AS #134. The next hop AS associated with the destination prefix 108 is AS #1258, and the AS-level path from the AS #6 to the destination prefix is [#6, #1258, #51, #67, #134]. Each of other ASes #1257, #850, #635, #1258, #51 and #67 of the distribution topology 100 of FIG. 1 includes the destination prefix 108 (e.g., 135.207.27/24) of destination AS #134, a next hop AS toward the destination prefix 108 (e.g., 135.207.27/24) of AS #134 and an AS-level path to the destination prefix 108 of destination AS #134.

The at least IGP router 208 is configured to maintain and exchange intra-domain routing information with the at least one BGP router 204 and/or between other multiple IGP routers to facilitate routing of IP traffic via the at least one intra-domain network 202. The at least one BGP router 204 is further configured to communicate IP traffic from a neighboring AS and destined for the at least one intra-domain network 202 of AS 200 to the at least one IGP router 208.

The prefix hijack monitor 210 is configured to monitor a destination prefix (e.g., 135.207.122/24) of a destination AS (e.g., AS #134) using a traceroute program. For example, by generating and transmitting traceroute messages of increasing time-to-live (TTL) value along a path to the destination prefix of the destination AS, the prefix hijacker monitor 210 is able to discover a router-level path towards the destination prefix by observing "TTL-reached-0" error messages transmitted back by intermediate routers as they decrement the TTL value of the traceroute messages when forwarding such messages. Such a router-level path is then converted to AS-level path based on which routers belong to which ASes. The prefix hijack monitor 210 transmits traceroute messages to ASes over the transmission network 102 via the intra-domain network 202 and the at least one BGP router 204.

Figure 3:
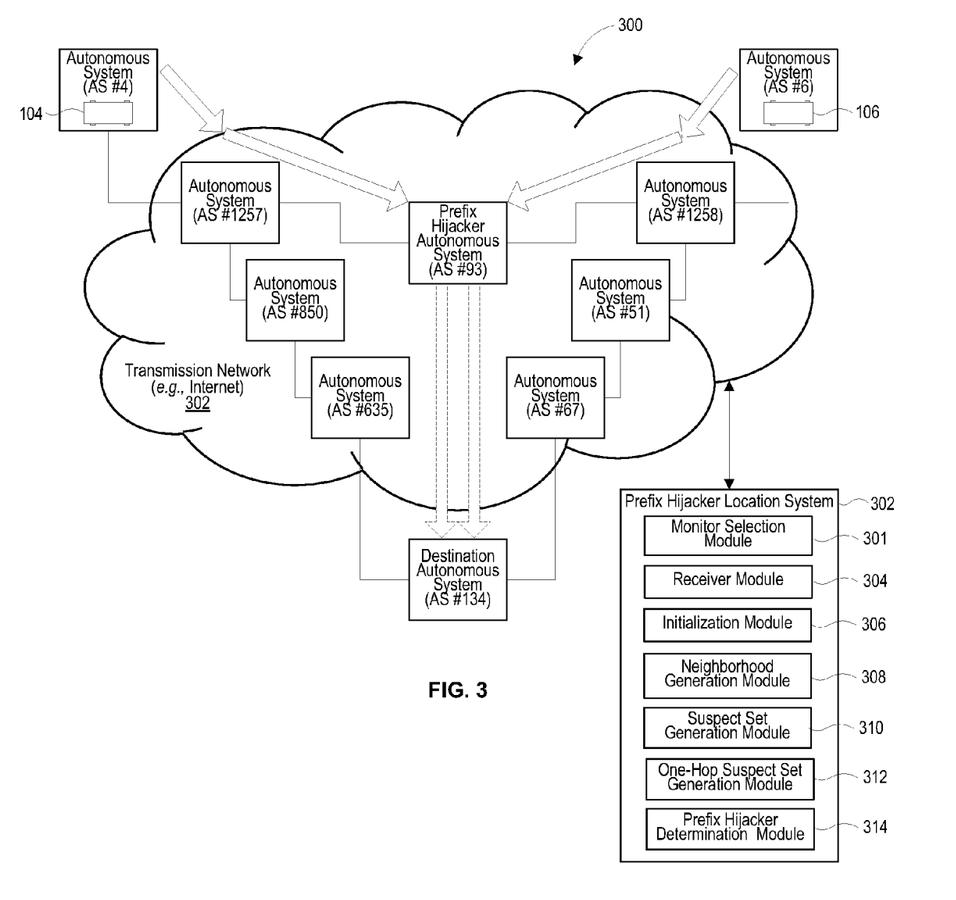

FIG. 3 is a block diagram of an example distribution topology 300 configured to distribute IP traffic to a destination AS #134 over a transmission network 302 after hijacking of a destination prefix 108 of the destination AS #134. As illustrated in the distribution network 300, a prefix hijacker AS system #93 is, for example, configured to maliciously hijack the destination prefix (e.g., 135.207.27/24) of the destination AS #134 to route IP traffic destined for the destination prefix through the prefix hijacker AS #93. To hijack the destination prefix, a BGP router (e.g., BGP router 204 of FIG. 2) of prefix hijacker AS system #93 is configured to generate and distribute an announcement message to ASes #1257 and #1258, neighbor ASes to prefix hijacker AS #93, announcing a fake AS-level path to the destination prefix (e.g., 135.207.27/24) of the destination AS #134. An example announcement message may include an originator AS (e.g., AS #93), a destination AS (e.g., destination AS #134), an AS-level distance from the originator AS to the destination AS (e.g., one hop), and an AS-level path from the originator AS to the destination AS (e.g., AS path=[#93, #134]).

In response to receiving the announcement message from the BGP router of AS #93, BGP routers of ASes #1257, #1258 (e.g., BGP router 204 of FIG. 2) are configured to determine whether the announced AS-level path to the destination AS #134 (e.g., AS path=[#93, #134]) is a better path than their original AS-level paths (e.g., original AS-level path of AS #1257=[#1257, #850, #635, #134]; original AS-level path of AS #1258=[#1258, #51, #67 #134]), as particularly shown in the distribution topology 100 of FIG. 1. In this example, the AS-level path announced by the prefix hijacker AS #93 is shorter than the AS-levels paths of ASes #1257, #1258. For example, the original AS-level path from AS #1257 to the destination AS #134 is three hops, ASes #850, #635, #134, while the AS-level path through the prefix hijacker AS #93 is two hops, ASes #93, #134. Similarly, the original AS-level path from AS #1258 to the destination AS #134 is three hops, ASes #51, #67, #134, while the AS-level path through the prefix hijacker AS #93 is two hops, ASes #93, #134. In this example, AS-level hop distance is used as a criterion to determine which AS-level path is better. Alternate or additional criteria to determine which AS-level path is better may be utilized.

Based on this determination, the BGP routers of ASes #1257, #1258 are configured to update their respective routing tables (e.g., routing table 206 of BGP router 204 of FIG. 2) for the destination prefix (e.g., 135.207.27/24). More specifically, the next hop AS is updated to AS #93 and the AS-level paths are updated to reflect paths through the prefix hijacker AS #93, as illustrated (via wide arrows) in the topology of the distribution network 300 of FIG. 3. The BGP router of AS #1257, is further configured, either concurrently with or after the determination, to generate and distribute an announcement message to ASes #4, #850, neighbor ASes to AS #1257, announcing its updated AS-level path (path through prefix hijacker AS #93) to the destination prefix (e.g., 135.207.27/24) of the destination AS #134. Similarly, the BGP router of AS #1258, is further configured, either concurrently with or after the determination, to generate and distribute an announcement message to ASes #6, #51, neighbor ASes to AS #1258, announcing its updated AS-level path (path through prefix hijacker AS #93) to the destination prefix (e.g., 135.207.27/24) of the destination AS #134.

Figure 4B:
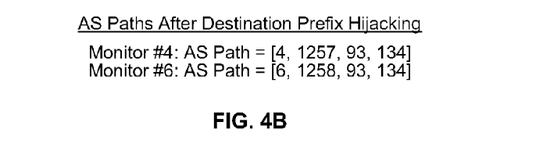
FIG. 4B illustrates example AS-level paths generated and reported by plural prefix hijack monitors after hijacking of a destination prefix of a destination autonomous system (AS)

The example distribution topology 300 of FIG. 3 is illustrated after the prefix hijacker hijacks the destination prefix 108 of the destination AS #134. Using the traceroute program described above, the prefix hijack monitors 104, 106 generate and transmit traceroute messages of increasing time-to-live (TTL) value to other ASes along paths (illustrated via wide arrows) to the destination prefix of the destination AS #134. Upon successfully reaching the destination prefix 108 of AS #134, the prefix hijack monitors 104, 106 generate and report AS-level paths to a prefix hijacker location system 302. The AS-level paths generated and reported by the prefix hijack monitors 104, 106 after hijacking of the destination prefix 108 of the destination AS #134 are illustrated in FIG. 4B. The AS-level path from the prefix hijack monitor 104 disposed at AS #4 is [#4, #1257, #93, #134] and the AS-level path from the prefix hijack monitor 106 disposed at AS #6 is [#6, #1258, #93, #134].

Now with reference to the prefix hijacker location system 302, prefix hijacker location system 302 is configured to locate a prefix hijacker AS #93 of a destination prefix (e.g., 135.207.27/12) within a one-hop neighborhood using reported AS-level paths from prefix hijack monitors 104, 106. Prefix hijacker location system 302 includes a monitor selection module 301, a receiver module 304, an initialization module 306, a neighborhood generation module 308, a suspect set generation module 310, a one-hop suspect set generation module 312, and a prefix hijacker determination module 314.

The monitor selection module 301 is configured to select plural prefix hijack monitors for a prefix hijack monitor set (M) from multiple candidate prefix hijack monitors that have been deployed on transmission network 302 for the destination prefix. For example, a certain number of the candidate prefix hijack monitors that have monitored the destination prefix (e.g., destination prefix of 135.207.122/24) may be selected. As an example, prefix hijack monitors 104, 106 may be selected for the prefix hijack monitor set (M). Assuming for example, if a multiplicity of prefix hijacker monitors were employed in the distribution topology 300 of FIG. 3, any subset that includes plural prefix hijacker monitors or all prefix hijacker monitors may be selected.

The receiver module 304 is configured to receive periodic or on-demand AS-level paths from the prefix hijack monitors 104, 106. For example, the receiver module 304 receives the example AS-level paths of FIG. 4B from the prefix hijack monitors 104, 106 after hijacking of the destination prefix (e.g., destination prefix of 135.207.122/24) of the destination AS #134. More specifically, the AS-level path received from the prefix hijack monitor 104 is [#4, #1257, #93, #134] and the AS-level path received from the prefix hijack monitor 106 is [#6, #1258, #93, #134].

The initialization module 306 is configured to initialize a suspect prefix hijacker AS set (H), a covered count set (C) and a total distance set (D) to empty or NULL sets. The suspect prefix hijacker AS set (H) will include ASes resulting from a union of all one-hop neighborhoods of each received AS-level path after hijacking. The generation of suspect prefix hijacker AS set (H) is described below with reference to the suspect set generation module 310. In the example distribution topology 300 of FIG. 3, there will be two one-hop neighborhoods, one for each prefix hijack monitor's AS-level path, as particularly described below.

The covered count set (C) will include a covered count entry for each AS in the suspect prefix hijacker AS set (H) to indicate how many times each AS appears in the one-hop neighborhoods of the AS-level paths. The total distance set (D) will include a total distance entry for each AS in the suspect prefix hijacker AS set (H) to indicate a total distance of each AS from the ASes in which the prefix hijack monitors 104, 106 are disposed. The generation of the covered count set (C) and the total distance set (D) for each AS in the suspect prefix hijacker AS set (H) is also described below with reference to the suspect set generation module 310.

The neighborhood generation module 308 is configured to generate a one-hop neighborhood for each prefix hijack monitor's AS-level path. The one-hop neighborhood for the AS-level path from prefix hijack monitor 104 is [#4, #1257, #850, #93, #1258, #134] and the one-hop neighborhood for the AS-level path from prefix hijack monitor 106 is [#6, #1258, #51, #93, #1257, #134].

The suspect set generation module 310 is configured to generate suspect prefix hijacker AS set (H) from the one-hop neighborhoods of prefix hijack monitors' AS-level paths. As mentioned above, the suspect prefix hijacker AS set (H) will include ASes resulting from a union of the one-hop neighborhoods of the AS-level paths. For example, the suspect prefix hijacker AS set (H) includes the following ASes [#4, #1257, #850, #93, #1258, #6, #51]. Because AS #134 is the destination prefix, it is not included in the suspect prefix hijacker AS set (H).

The suspect set generation module 310 is also configured to determine the covered count set (C) indicating how many times each AS of the suspect prefix hijacker AS set (H) appears in the one-hop neighborhoods of the AS-level paths. For example, because AS #93 appears twice in the one-hop neighborhoods of the AS-level paths, the covered count entry for AS #93 in covered count set (C) will have a value of two (2).

The suspect set generation module 310 is further configured to determine the total distance set (D) indicating a total distance of each AS in the suspect prefix hijacker AS set (H) from the ASes in which the prefix hijack monitors 104, 106 are disposed. For example, the total distance entry of total distance set (D) for prefix hijacker AS #93 will have a value of four (4), e.g., prefix hijacker AS #93 is two hops away from AS #4 of prefix hijack monitor 104 and two hops away from AS #6 of prefix hijack monitor 106. For an AS that is a neighbor of an AS-level path but not included on the AS-level path (e.g., neighbor AS), a distance from the neighbor AS to an AS in which a prefix hijack monitor is disposed may be determined as a distance from the AS in which the prefix hijack monitor is disposed to a nearest AS that is both included on the AS-level path and is a neighbor of the neighbor AS plus one (1). For example, a total distance for AS #850, as a neighbor of an AS-level path from AS #4 in which prefix hijack monitor 104 is disposed to the destination prefix (e.g., destination AS #134), is determined to be a distance from AS #1257 (nearest neighbor of AS #850 and on the AS-level path) to AS #4 plus one (1) (e.g., value of two (2)).

Based on the foregoing example, the suspect set generation module 310 generates a suspect prefix hijacker AS set (H)= [#4, #1257, #850, #93, #1258, #6, #51]. The suspect set generation module 310 further determines for each AS in the prefix hijacker AS set (H) its covered count in covered count set (C) and its total distance in total distance set (D) as illustrated Table 1 below:

TABLE 1

| AS Set (H) | Covered Count Set (C) | Total Distance Set (D) |
| --- | --- | --- |
| 4 | 1 | 0 |
| 1257 | 2 | 4 |
| 850 | 1 | 2 |
| 93 | 2 | 4 |
| 1258 | 2 | 4 |
| 6 | 1 | 0 |
| 51 | 1 | 2 |

The one-hop suspect set generation module 312 is configured generate a one-hop suspect set that locates a prefix hijacker AS of a destination prefix (e.g., 135.207.27/12) to within a one-hop neighborhood. More specifically, the one-hop suspect set generation module 312 is configured to determine a one-hop suspect set of ASes (A) in the suspect prefix hijacker AS set (H) that includes ASes having the highest covered count in covered count set (C) and the highest total distances in total distance set (D). For example, ASes #1257, #93 and #1258 of the suspect prefix hijacker AS set (H) are determined to have the highest covered counts in covered count set (C) and the highest total distances in total distance set (D), shown in gray color in Table 1 above.

Thus, the one-hop suspect set of ASes (A) generated by the one hop suspect set generation module 312 includes ASes #1257, #93 and #1258, which have the highest covered counts in covered count set (C) and the highest total distance in the total distance set (D). The foregoing ASes are within a one-hop neighborhood of a prefix hijacker AS (e.g., prefix hijacker AS #93), and therefore, are most suspicious AS suspects of being the prefix hijacker AS.

A fundamental concept of the foregoing is a determination of common ASes amongst hijacked monitor-to-destination AS-level paths. In a case in which the prefix hijacker AS (e.g., AS #93) does not try to conceal its identity, the prefix hijacker's AS will show up in the altered AS-level paths. Therefore, the prefix hijacker AS is amongst the ASes which are common (e.g., common ASes) to all hijacked monitor-to-destination AS-level paths. More specifically, among the common ASes, the prefix hijacker AS is an AS that is closest to the ASes of the prefix hijacker monitors because for all hijacked AS-level paths the portions of the AS-level paths after the prefix hijacker AS are the same.

In another case, a monitor-to-destination AS-level path may be reported as hijacked but which was in fact altered because of another reason. In such a case, there may not be common ASes other than the destination AS of the destination prefix. The determination of common ASes amongst monitor-to-destination AS-level paths may not be adequate. Therefore, a determination of a covered count for each suspect AS is performed. In other words, ASes common to a greatest number of monitor-to-destination AS-level paths are determined.

In a more complex case, the prefix hijacker (e.g., AS #93) attempts to conceal its own AS from the monitor-to-destination AS-level paths by using fake identities to respond to the traceroute messages used by the prefix hijack monitors in generating monitor-to-destination AS-level paths. Even in such a case, the identity of an AS (e.g., AS #1257 or #1258) immediately preceding the prefix hijacker (e.g., AS #93) on each AS-level path is still accurate. Therefore, the prefix hijacker (e.g., AS #93) must be present in the one hop suspect set of each monitor-to-destination AS-level path.

The prefix hijacker determination module 314 is configured to refine the one-hop suspect set of ASes (A) determined to include most suspicious AS suspects (e.g., ASes #1257, #93 and #1258) by determining a center of one-hop neighborhoods of each AS in the one-hop suspect set of ASes (A), which is likely to indicate the prefix hijacker AS (e.g., prefix hijacker AS #93). The prefix hijacker determination module 314 is configured to determine a one-hop neighbor set for each AS in the one-hop suspect set of ASes (A). This one-hop neighbor set for each such AS includes only the one-hop neighbors of the AS, not the AS itself. For example, a one-hop neighbor set of AS #1257 includes ASes #4, #93, and #850; a one-hop neighbor set of AS #1258 includes ASes #6, #93, and #51; a one-hop neighbor set of AS #93 includes ASes #1257 and #1258.

From the one-hop neighbor sets, the prefix hijacker determination module 314 is further configured to select an AS that appears most (e.g., highest covered count) in the one-hop neighbor sets, as the center AS of the one-hop neighbor sets. The center AS most likely indicates the prefix hijacker AS. In the foregoing example, AS #93 appeared twice (e.g., covered count is 2) and ASes #1257 and #1258 appeared once (e.g., each AS's covered count is 1) in the one-hop neighbor sets of the ASes in the one-hop suspect set of ASes (A). These covered counts may be accumulated with the covered counts in the respective covered count entries of the covered count set (C) because a highest covered count of an AS from all ASes of the suspect prefix hijacker AS set (H) is important for determination of the prefix hijacker. For example, the total covered count in covered count set (C) for AS #93 will be four (4), and for each of ASes #1257 and #1258, the covered count in the covered count set (C) will be three (3). The AS that has the highest covered count in covered count set (C) (e.g., AS #93) may then be selected. Therefore, the prefix hijacker determination module 314 selects AS #93 as the center and therefore the most likely prefix hijacker AS of the destination prefix.

FIG. 4A illustrates example AS-level paths generated and reported by the prefix hijack monitors 104, 106 of FIG. 1 before hijacking of the destination prefix 108 of the destination AS #134. The AS-level path from the prefix hijack monitor 104 disposed at AS #4 is [#4, #1257, #850, #635, #134] and the AS-level path from the prefix hijack monitor 106 disposed at AS #6 is [#6, #1258, #51, #67, #134].

FIG. 4B illustrates example AS-level paths generated and reported by the prefix hijack monitors 104, 106 after hijacking of the destination prefix 108 of the destination AS #134. The AS-level path from the prefix hijack monitors 104 disposed at AS #4 is [#4, #1257, #93, #134] and the AS-level path from the prefix hijack monitors 106 disposed at AS #6 is [#6, #1258, #93, #134].

Figure 5:
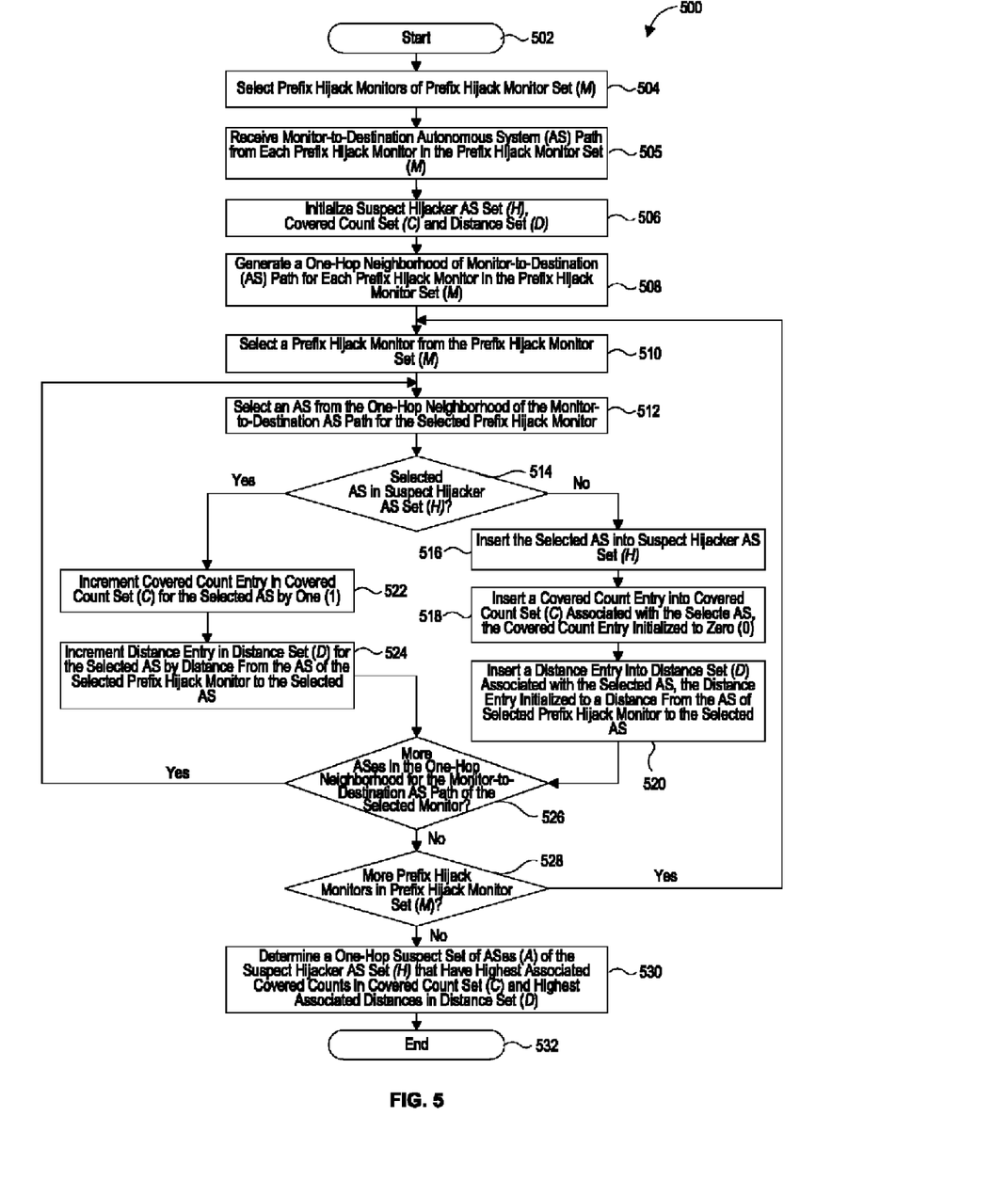
FIG. 5 is a flowchart that illustrates an example method to locate a prefix hijacker of a destination prefix to within a one-hop neighborhood using reported autonomous system (AS)-level paths from plural prefix hijack monitors.

FIG. 5 is a flowchart that illustrates an example method 500 to locate a hijacker of a destination prefix to within a one-hop neighborhood using reported AS-level paths from plural prefix hijack monitors. The method 500 starts at operation 502. At operation 504, prefix hijack monitors for a prefix hijack monitor set (M) are selected. As an example, monitor selection module 301 may include prefix hijack monitors 104, 106 in the prefix hijack monitor set (M). At operation 505, a monitor-to-destination autonomous system (AS) path from each prefix hijack monitor in the prefix hijack monitor set (M) is received. For example, receiver module 304 may receive the AS-level paths prefix hijack monitor 104, 106. At operation 506, a suspect hijacker AS set (H), covered count set (C) and distance set (D) are initialized to empty or NULL sets. For example, the initialization module 306 may initialize the H, C and D sets.

At operation 508, a one-hop neighborhood of monitor-to-destination AS path is generated for each prefix hijack monitor of the prefix hijack monitor set (M). For example, the neighborhood generation module 308 may generate the one-hop neighborhood of monitor-to-destination AS path for each prefix hijack monitor of the prefix hijack monitor set (M). As an example, the one-hop neighborhood of an AS path from AS #4 (at which prefix hijack monitor 104 is disposed) to destination AS #134 of the destination prefix (e.g., 135.207.122/24) is [#4, #1257, #850, #93, #1258, #124]. As another example, the one-hop neighborhood of an AS path from AS #6 (at which prefix hijack monitor 106 is disposed) to destination AS #134 is [#6, #1258, #51, #93, #1257, #134].

The following operations 510-528 may be performed by the suspect set generation module 310 of FIG. 3. At operation 510, a prefix hijacker monitor is selected from the prefix hijack monitor set (M). As an example, prefix hijack monitor 104 may be selected from the prefix hijack monitor set (M). At operation 512, an AS is selected from the one-hop neighbourhood of the monitor-to-destination AS path for the selected prefix hijacker monitor. At operation 514, a determination is made as to whether the selected AS is in the suspect hijacker AS set (H).

If at operation 514, it is determined that the selected AS is not in the suspect hijacker AS set (H), the method 500 continues at operation 516, where the selected AS is inserted into the suspect hijacker AS set (H). At operation 518, a covered count entry that is associated with the selected AS is inserted into the cover count set (C). The inserted covered count entry is initialized to a value of zero (0). At operation 520 a distance entry that is associated with the selected AS is inserted into the distance set (D). The inserted distance entry is initialized to an AS-level distance from the AS of the selected prefix hijack monitor to the selected AS. The method 500 continues at operation 526 described below.

If at operation 514, it is determined that the selected AS is in the suspect hijacker AS set (H), the method 500 continues at operation 522, where the covered count entry in covered count set (C) for the selected AS is incremented by one (1). At operation 524, the distance entry in the distance set (D) for the selected AS is incremented by an AS-level distance from the AS of the selected prefix hijack monitor to the selected AS. The method 500 continues at operation 526 described below.

At operation 526, a determination is made as to whether there are more ASes in the one-hop neighborhood for the monitor-to-destination AS path of the selected monitor. If at operation 526, it is determined that there are more ASes in the one-hop neighborhood for the monitor-to-destination AS path of the selected monitor, the method 500 continues at operation 512, and operations 512-526 are iteratively repeated until it is determined that there are no more ASes in the one-hop neighborhood for the monitor-to-destination AS path of the selected monitor, at operation 526.

If at operation 526, it is determined that there are no more ASes in the one-hop neighborhood for the monitor-to-destination AS path of the selected monitor, the method continues at operation 528, where a determination is made as to whether there are more prefix hijack monitors in the prefix hijack monitor set (M). If at operation 528, it is determined that there are more prefix hijack monitors in the prefix hijack monitor set (M), the method 500 continues at operation 510, and operations 510-528 are iteratively repeated until it is determined that there are no more prefix hijack monitors in the prefix hijack monitor set (M), at operation 528. If at operation 528, it is determined that there are no more prefix hijack monitors in the prefix hijack monitor set (M), the method 500 continues at operation 530, where a one-hop suspect set of ASes (A) of the suspect hijacker AS set (H) is determined. The one-hop suspect set of ASes (A) includes ASes of the suspect hijacker AS set (H) that have the highest associated covered counts in covered count set (C) and the highest associated total distances in total distance set (D). The one-hop suspect set of ASes (A) locates a prefix hijacker of a destination prefix to within a one-hop neighborhood (e.g., ASes #1257, #93, #1258). The method ends 500 at operation 532.

Figure 6:
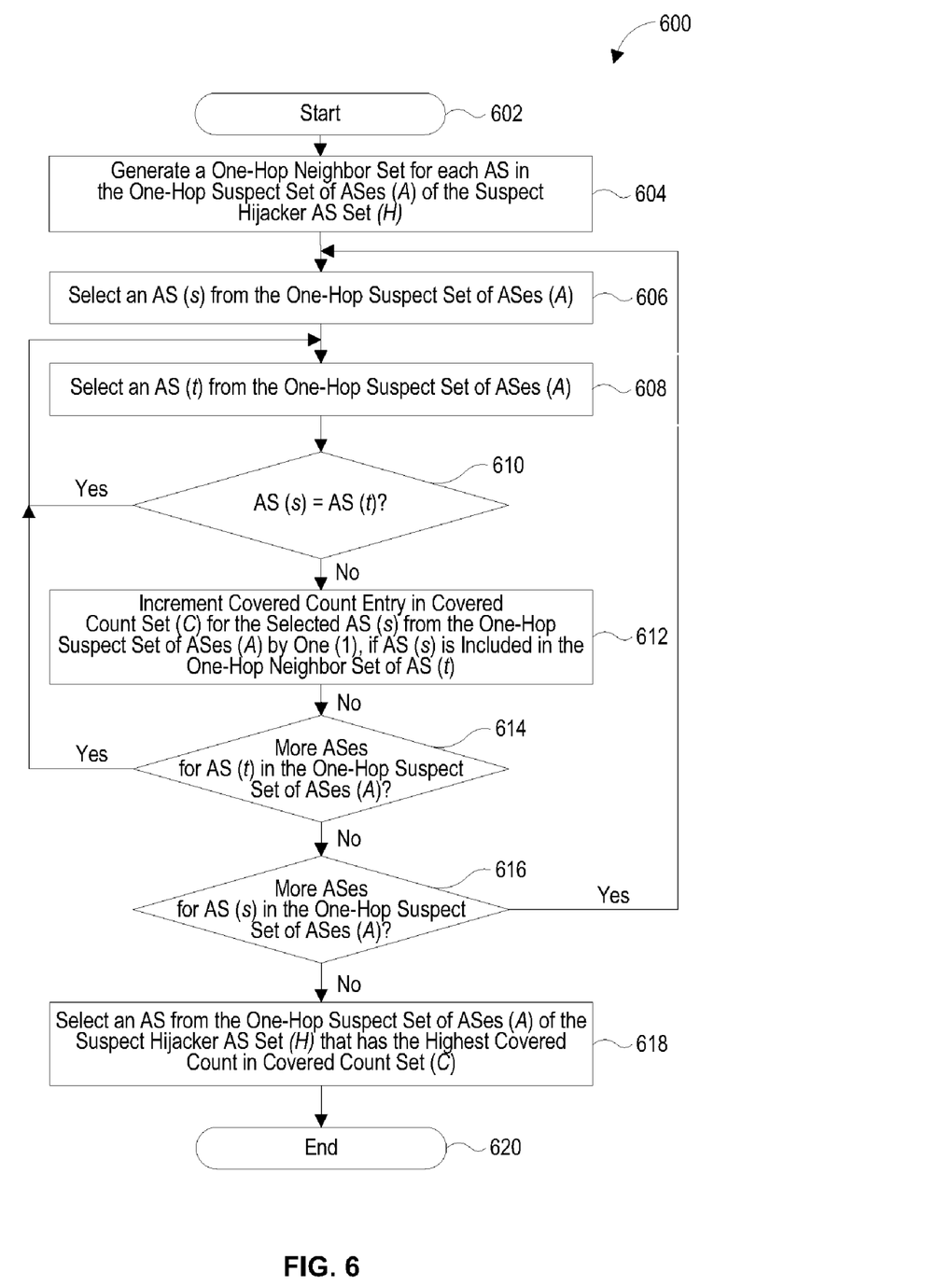
FIG. 6 is a flowchart that illustrates an example method to locate a prefix hijacker of a destination prefix from within a one-hop neighborhood of the prefix hijacker.

FIG. 6 is a flowchart that illustrates an example method 600 to locate a prefix hijacker of a destination prefix from a one-hop suspect set of ASes (A) of the suspect hijacker AS set (H) determined in method 500 of FIG. 5. The one-hop suspect set of ASes (A) includes ASes #1257, #93 and #1258, illustrated in Table 1 with the highest covered counts and total distances. Operations 604-618 may, for example, be performed by the prefix hijacker determination module 314 of FIG. 3. The method 600 begins at operation 602. At operation 604, a one-hop neighbor set for each AS in the one-hop suspect set (A) of the suspect hijacker AS set (H) is generated. The one-hop neighbor set for each AS of the one-hop suspect set (A) includes its neighbors only, but does not include each AS. For example, for AS #1257 the one-hop neighborhood is [#4, #93, #850]; for AS #93 the one-hop neighborhood is [#1257, #1258, #134]; and for AS #1258 the one-hop neighborhood is [#6, #51, #93].

At operation 606, an AS (s) is selected from the one-hop suspect set of ASes (A). For example, AS #1257 is selected. At operation 608, an AS (t) is selected from the one-hop suspect set of ASes (A). For example, AS #1257 is selected. At operation 610, a determination is made as to whether AS (s) is equal to AS (t). If at operation 610, AS (s) is equal to AS (t), the method 600 continues at operation 608 and operations 608 and 610 are performed to select a next AS (t) from the one-hop suspect set of ASes (A). For example, AS #93 is selected. If at operation 610, AS (s) is not equal to AS (t), the method 600 continues at operation 612.

At operation 612, the covered count entry in covered count set (C) is incremented by one (1) for the selected AS (s) from the one-hop suspect set of ASes (A), if the selected AS (s) is included in the one-hop neighbor set of AS (t). For example, the covered count for AS #1257 is incremented from two (2) to three (3). At operation 614, a determination is made as to whether there are more ASes for AS (t) in the one-hop suspect set of ASes (A). If there are more ASes to be selected for AS (t) at operation 614, the method 500 continues at operation 608 and operations 608-614 are performed iteratively for the selected AS (s) and all possible AS (t) from the one-hop suspect set of ASes (A).

If at operation 614, there are no more ASes to be selected for AS (t), the method 500 continues at operation 616, where a determination is made as to whether there are more ASes for AS (s) in the one-hop suspect set of ASes (A). If there are more ASes to be selected for AS (s) at operation 616, the method continues at operation 606 and operations 606-614 are performed for all possible AS (s) from the one-hop suspect set of ASes (A). If there are no more ASes to be selected for AS (s) at operation 616, the method 500 continues at operation 618. At the completion of all iterations of operations 606-616, the covered count of AS #1257 is three (3), the covered count of AS #93 is four (4), and covered count of AS #1258 is three (3), as compared to the covered counts in Table 1. At operation 618, an AS is selected from the one-hop suspect set of ASes (A) of the suspect hijacker AS set (H) that has the highest covered count in the covered count set (C). For example, AS #93 has the highest covered count of four (4), indicating that AS #93 is a center of the one-hop neighborhoods of the ASes in the one-hop suspect set of ASes (A), and thus AS #93 is the most likely prefix hijacker of the destination prefix. The method 600 ends at operation 620.

Figure 7:
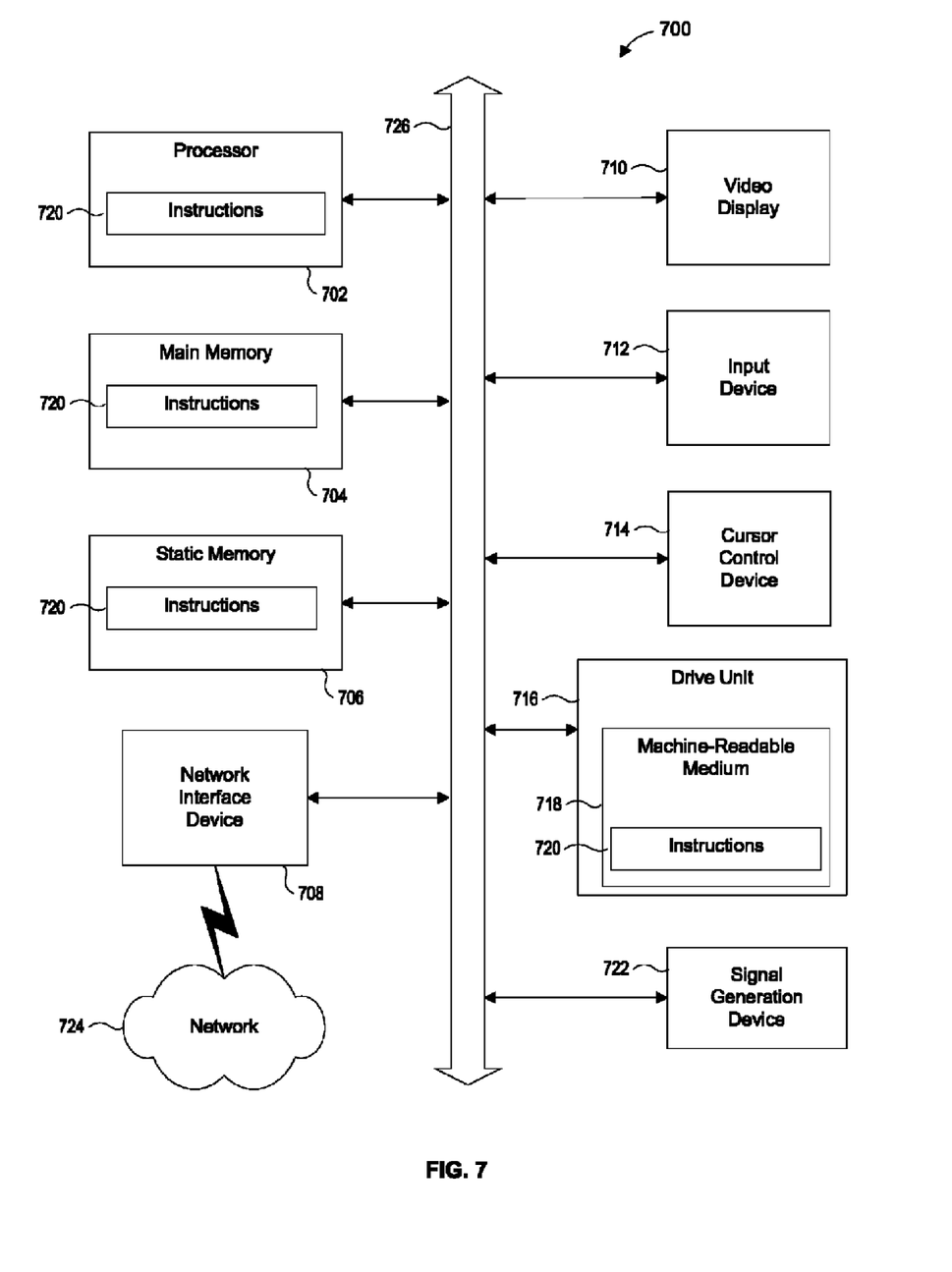
FIG. 7 is a block diagram that illustrates a general computer system.

FIG. 7 is a block diagram that illustrates a general computer system 800. The computer system 700 may include a set of instructions that may be executed to cause the computer system 700 to perform any one or more of the computer based functions or methods disclosed herein. The computer system 700, or any portion thereof, may operate as a standalone device or may be connected, e.g., using a network, to other computer systems or peripheral devices.

In a networked deployment, the computer system 700 may operate in the capacity of a BGP router, an IGP router, a prefix hijack monitor, or a prefix hijacker location system. The computer system 700 may also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 may include a main memory 704 and a static memory 706 that may communicate with each other via a bus 726. As shown, the computer system 700 may further include a video display unit 710, such as a liquid crystal display (LCD), an organic light emitting diode (OLED), a projection unit, a television, a flat panel display, a solid state display, or a cathode ray tube (CRT). Additionally, the computer system 700 may include an input device 712, such as a keyboard, and a cursor control device 714, such as a mouse. The computer system 700 may also include a disk drive unit 716, a signal generation device 722, such as a speaker or remote control, and a network interface device 708.

In a particular embodiment, as depicted in FIG. 7, the disk drive unit 716 may include a computer-readable medium 718 in which one or more sets of instructions 720, e.g., software, may be embedded. Further, the instructions 720 may embody one or more of the methods or logic as described herein. In a particular embodiment, the instructions 720 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments, the methods described herein may be implemented by software programs tangibly embodied in a processor-readable medium and may be executed by a processor. Further, in an exemplary, non-limited embodiment, implementations may include distributed processing, component/object distributed processing, and parallel processing. Alternatively, virtual computer system processing may be constructed to implement one or more of the methods or functionality as described herein.

The present application contemplates a computer-readable medium that includes instructions 720 or receives and executes instructions 720 responsive to a propagated signal, so that a device connected to a network 724 may communicate voice, video or data over the network 724. Further, the instructions 720 may be transmitted or received over the network 724 via the network interface device 708.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a medium that is equivalent to a tangible storage medium. Accordingly, the application is considered to include any one or more of a computer-readable medium and other equivalents and successor media, in which data or instructions may be stored.

Although the present application describes components and functions that may be implemented in particular embodiments with reference to particular standards and protocols, the application is not limited to such standards and protocols. Such standards and protocols are periodically superseded by faster or more efficient equivalents having essentially the same functions. Accordingly, replacement standards and protocols having the same or similar functions as those disclosed herein are considered equivalents thereof.

Thus, a system, method and computer-readable storage medium to locate a prefix hijacker of a destination prefix within a one-hop neighborhood on a network have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this application. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept. Thus, although specific embodiments have been illustrated and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein, will be apparent to those of skill in the art upon reviewing the above description.

The Abstract is provided to comply with 37 C.F.R. §1.72(b) and will allow the reader to quickly ascertain the nature of the technical disclosure of this application. It is submitted with the understanding that it will not be used to interpret or limit the scope or meaning of the claims.

In the foregoing description of the embodiments, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

The invention claimed is:

1. A method of locating a prefix hijacker within a one-hop neighborhood, the method comprising:
   generating, using a computing system, one-hop neighborhoods from autonomous system-level paths to a destination prefix, the autonomous system-level paths associated with a plurality of monitors, each of the one-hop neighborhoods including autonomous system identifiers that are in an autonomous system-level path and autonomous system-level identifiers that are not in the autonomous system-level path and are within one-hop of the autonomous system identifiers in the autonomous system-level path;
   determining, using the computing system, a suspect set of autonomous system identifiers resulting from a union of the one-hop neighborhoods excluding an autonomous system identifier associated with the destination prefix;
   calculating, using the computing system, a count and a distance associated with each autonomous system identifier in the suspect set of autonomous system identifiers, the count representing how often an autonomous system identifier in the suspect set of autonomous system identifiers appears in the one-hop neighborhoods, the distance representing a total number of autonomous system identifiers from the autonomous system identifier in the suspect set of autonomous system identifiers to autonomous system identifiers associated with the plurality of monitors; and
   generating, using the computing system, a one-hop suspect set including autonomous system identifiers in the suspect set that have a greatest sum of the count and the distance.

2. The method of locating a prefix hijacker of claim 1, wherein the method further comprises selecting the plurality of monitors from a of monitors that have monitored the destination prefix.

3. The method of locating a prefix hijacker of claim 2, wherein the method further comprises receiving an autonomous system-level path from each of the plurality of monitors to an autonomous system identifier associated with the destination prefix.

4. The method of locating a prefix hijacker of claim 1, wherein determining the suspect set of autonomous system identifiers further comprises:
    selecting an autonomous system identifier from a one-hop neighborhood of a selected monitor from the plurality of monitors;
    determining whether the selected autonomous system identifier is in the suspect set of autonomous system identifiers;
    selectively inserting the selected autonomous system identifier into the suspect set of autonomous system identifiers if the selected autonomous system identifier is not in the suspect set of autonomous system identifiers; and
    iteratively performing the selecting, determining and selectively inserting for other selected monitors from the plurality of monitors.

5. The method of locating a prefix hijacker of claim 4, wherein calculating the count and the distance associated with each autonomous system identifier in the suspect set of autonomous system identifiers further comprises:
    selectively initializing the count associated with the selected autonomous system identifier to a count value of zero when the selected autonomous system identifier is inserted into the suspect set of autonomous system identifiers; and
    selectively initializing the distance associated with the selected autonomous system identifier to a distance value from an autonomous system identifier associated with the selected monitor to the selected autonomous system identifier when the selected autonomous system identifier is inserted into the suspect set of autonomous system identifiers.

6. The method of locating a prefix hijacker of claim 4, wherein calculating the count and the distance associated with each autonomous system identifier in the suspect set of autonomous system identifiers further comprises:
    selectively incrementing the count associated with the selected autonomous system identifier by one when the selected autonomous system identifier is in the suspect set of autonomous system identifiers; and
    selectively incrementing the distance associated with the selected autonomous system identifier by a distance value from an autonomous system identifier associated with the selected monitor to the selected autonomous system identifier when the selected autonomous system identifier is in the suspect set of autonomous system identifiers.

7. The method of locating a prefix hijacker of claim 1, wherein the method further comprises determining an autonomous system identifier associated with the prefix hijacker from the one-hop suspect set of autonomous system identifiers.

8. The method of locating a prefix hijacker of claim 7, wherein determining the autonomous system identifier associated with the prefix hijacker from the one-hop suspect set of autonomous system identifiers further comprises:
    generating a one-hop neighbor set for each autonomous system identifier in the one-hop suspect set;
    incrementing the count of each autonomous system identifier in the one-hop suspect set if the autonomous system identifier is included in the one-hop neighbor set of each other autonomous system identifier in the one-hop suspect set; and
    selecting an autonomous system identifier that has a greatest count as the autonomous system identifier associated with the prefix hijacker.

9. A prefix hijacker location system, the system comprising:
    a neighborhood generation module configured to generate one-hop neighborhoods from autonomous system-level paths to a destination prefix, the autonomous system-level paths associated with a plurality of monitors, each of the one-hop neighborhoods including autonomous system identifiers that are in an autonomous system-level path and autonomous system-level identifiers that are not in its autonomous system-level path and are within one-hop of the autonomous system identifiers in the autonomous system-level path;
    a suspect set generation module configured to determine a suspect set of autonomous system identifiers resulting from a union of the one-hop neighborhoods excluding an autonomous system identifier associated with the destination prefix, the suspect set generation module further configured to calculate a count and a distance associated with each autonomous system identifier in the suspect set of autonomous system identifiers, the count indicating representing how often an autonomous system identifier in the suspect set of autonomous system identifiers appears in the one-hop neighborhoods, the distance representing a total number of autonomous system identifiers from the autonomous system identifier in the suspect set of autonomous system identifiers to autonomous system identifiers associated with the plurality of monitors; and
    a one-hop suspect set generation module configured to generate a one-hop suspect set including autonomous system identifiers in the suspect set that have a greatest sum of the count and the distance.

10. The prefix hijacker location system of claim 9, further comprising a monitor selection module configured to select the plurality of monitors from a plurality of monitors that have monitored the destination prefix.

11. The prefix hijacker location system of claim 10, further comprising a receiver module configured to receive an autonomous system-level path from each of the plurality of monitors to an autonomous system identifier associated with the destination prefix.

12. The prefix hijacker location system of claim 9, wherein the suspect set generation module is further configured to:
    select an autonomous system identifier from a one-hop neighborhood of a selected monitor from the plurality of monitors;
    determine whether the selected autonomous system identifier is in the suspect set of autonomous system identifiers;
    selectively insert the selected autonomous system identifier into the suspect set of autonomous system identifiers if the selected autonomous system identifier is not in the suspect set of autonomous system identifiers; and
    iteratively select, determine and selectively insert an autonomous system identifier into the suspect set of autonomous system identifiers for other selected monitors from the plurality of monitors.

13. The prefix hijacker location system of claim 12, wherein the suspect set generation module is further configured to:
selectively initialize the count associated with the selected autonomous system identifier to a count value of zero when the selected autonomous system identifier is inserted into the suspect set of autonomous system identifiers; and
selectively initialize the distance associated with the selected autonomous system identifier to a distance value from an autonomous system identifier associated with the selected monitor to the selected autonomous system identifier when the selected autonomous system identifier is inserted into the suspect set of autonomous system identifiers.

14. The prefix hijacker location system of claim 12, wherein the suspect set generation module is further configured to:
selectively increment the count associated with the selected autonomous system identifier by one when the autonomous system AS identifier is in the suspect set of autonomous system identifiers; and
selectively increment the distance associated with the selected autonomous system identifier by a distance value from an autonomous system identifier associated with the selected monitor to the selected autonomous system identifier when the selected autonomous system identifier is in the suspect set of autonomous system identifiers.

15. The prefix hijacker location system of claim 9, further comprising a prefix hijacker determination module configured to determine an autonomous system identifier associated with the prefix hijacker from the one-hop suspect set of autonomous system identifiers.

16. The prefix hijacker location system of claim 15, wherein the prefix hijacker determination module is configured to:
generate a one-hop neighbor set for each autonomous system identifier in the one-hop suspect set;
increment the count of each autonomous system identifier in the one-hop suspect set if the autonomous system identifier is included in the one-hop neighbor set of each other autonomous system identifier in the one-hop suspect set; and
select an autonomous system identifier that has a greatest count as the autonomous system identifier associated with the prefix hijacker.

17. A non-transitory computer-readable storage medium comprising instructions that, when executed by a processor, cause the processor to:
generate one-hop neighborhoods from autonomous system-level paths to a destination prefix, the autonomous system-level paths associated with a plurality of monitors, each of the one-hop neighborhoods including autonomous system identifiers that are in an autonomous system-level path and autonomous system-level identifiers that are not in its autonomous system-level path and are within one-hop of the autonomous system identifiers in the autonomous system-level path;
determine a suspect set of autonomous system identifiers resulting from a union of the one-hop neighborhoods excluding an autonomous system identifier associated with the destination prefix;
calculate a count and a distance associated with each autonomous system identifier in the suspect set of autonomous system identifiers, the count representing how often an autonomous system identifier in the suspect set of autonomous system identifiers appears in the one-hop neighborhoods, the distance representing a total number of autonomous system identifiers from the autonomous system identifier in the suspect set of autonomous system identifiers to autonomous system identifiers associated with the plurality of monitors; and
generate a one-hop suspect set including autonomous system identifiers in the suspect set that have a greatest sum of the count and the distance.

18. The non-transitory computer-readable storage medium of claim 17, wherein the medium further comprises instructions that, when executed by the processor, cause the processor to select the plurality of monitors from monitors that have monitored the destination prefix.

19. The non-transitory computer-readable storage medium of claim 18, wherein the medium further comprises instructions that, when executed by the processor, cause the processor to receive an autonomous system-level path from each of the plurality of monitors to an autonomous system identifier associated with the destination prefix.

20. The non-transitory computer-readable storage medium of claim 17, wherein instructions that cause the processor to determine the suspect set of autonomous system identifiers further comprise instructions that, when executed by the processor, cause the processor to:
select an autonomous system identifier from a one-hop neighborhood of a selected monitor from the plurality of monitors;
determine whether the selected autonomous system identifier is in the suspect set of autonomous system identifiers;
selectively insert the selected autonomous system identifier into the suspect set of autonomous system identifiers if the selected autonomous system identifier is not in the suspect set of autonomous system identifiers; and
iteratively select, determine and selectively insert an autonomous system identifier for other selected monitors from the plurality of monitors.

21. The non-transitory computer-readable storage medium of claim 20, wherein instructions that cause the processor to calculate the count and the distance associated with each autonomous system identifier in the suspect set of autonomous system identifiers further comprise instructions that, when executed by the processor, cause the processor to:
selectively initialize the count associated with the selected autonomous system identifier to a count value of zero when the selected autonomous system identifier is inserted into the suspect set of autonomous system identifiers; and
selectively initialize the distance associated with the selected autonomous system identifier to a distance value from an autonomous system identifier associated with the selected monitor to the selected autonomous system identifier when the selected autonomous system identifier is inserted into the suspect set of autonomous system identifiers.

22. The non-transitory computer-readable storage medium of claim 20, wherein instructions that cause the processor to calculate the count and the distance associated with each autonomous system identifier in the suspect set of autonomous system identifiers further comprise instructions that, when executed by the processor, cause the processor to:
selectively increment the count associated with the selected autonomous system identifier by one when the selected autonomous system identifier is in the suspect set of autonomous system identifiers; and selectively increment the distance associated with the selected autonomous system identifier by a distance value from an autonomous system identifier associated with the selected monitor to the selected autonomous system identifier when the selected autonomous system identifier is in the suspect set of autonomous system identifiers.

23. The non-transitory computer-readable storage medium of claim 17, wherein the medium further comprises instructions that, when executed by the processor, cause the processor to determine an autonomous system identifier associated with the prefix hijacker from the one-hop suspect set of autonomous system identifiers.

24. The non-transitory computer-readable storage medium of claim 23, wherein instructions that cause the processor to determine the autonomous system identifier associated with the prefix hijacker from the one-hop suspect set of autonomous system identifiers further comprise instructions that, when executed by the processor, cause the processor to:

generate a one-hop neighbor set for each autonomous system identifier in the one-hop suspect set;

increment the count of each AS identifier in the one-hop suspect set if the autonomous system identifier is included in the one-hop neighbor set of each other autonomous system identifier in the one-hop suspect set; and select an autonomous system identifier that has a greatest count as the autonomous system identifier associated with the prefix hijacker.

* * * * *